July 27, 1954  E. ROOT III  2,685,025
ELECTROLYTIC DEVICE

Filed March 17, 1948  2 Sheets-Sheet 1

INVENTOR.
ELIHU ROOT III
BY Wm O. Moesen
ATTORNEY

July 27, 1954

E. ROOT III 2,685,025

ELECTROLYTIC DEVICE

Filed March 17, 1948

INVENTOR.
ELIHU ROOT III
BY Wm O. Morser
ATTORNEY

Patented July 27, 1954

2,685,025

UNITED STATES PATENT OFFICE 2,685,025

ELECTROLYTIC DEVICE

Elihu Root III, Springfield, Vt.

Application March 17, 1948, Serial No. 15,360

2 Claims. (Cl. 250—23)

My invention relates to electron discharge devices, and relates more particularly to electric tubes which apply electrolytic principles in a novel manner.

One object of my invention is to provide sensitive means for the amplification of currents and voltages of small magnitude. In some forms my invention may be used in circuits closely analogous to those for a conventional vacuum tube. However, it can operate effectively at much lower electrode potentials and with a much lower power consumption. My device is useful principally in the frequency range from direct current to low audio frequencies.

With this and other objects in view, as will hereinafter appear, my invention comprises an envelope and electrodes, of suitable conformation and in contact with a suitable electrolyte. The output circuit of my device depends on electrolytic conduction, and the current flowing therein will be a function of the rate of access, to one of the electrode surfaces, of a depolarizing substance, such rate of access in turn being a function of an input signal which may take the form of a voltage, a transfer of electrical charge, a fluid flow, or the mechanical displacement of an electrode. If the input signal takes the form of a voltage, the tube may operate as an amplifier. If the signal is measured in terms of charge transfer, the tube forms an effective current integrating device. If the signal is provided by the fluid flow of the electrolyte, an effective flow meter is provided. If the signal is provided by motion of an electrode, then the tube may be used to indicate and measure mechanical deflection, produced, for example, by the displacement of members under stress.

It is, accordingly a major object of my invention to provide an electrochemical device which responds to the rate of access of a depolarizing substance to an electrode.

It is another object of my invention to provide current integrating means whereby the current flowing in an output circuit is substantially proportional to the time integral of current flowing in an input circuit.

It is a further object of my invention to provide a sensitive flow indicator.

It is a further object of my invention to provide an electrochemical indicator of mechanical deflection.

These and other objects and advantages of my invention will become readily apparent to persons skilled in the art from the following detailed specification together with the drawings forming a part thereof, in which Figure 1 is a cross sectional view of an electrolytic amplifier tube together with an operating circuit;

Figure 1:
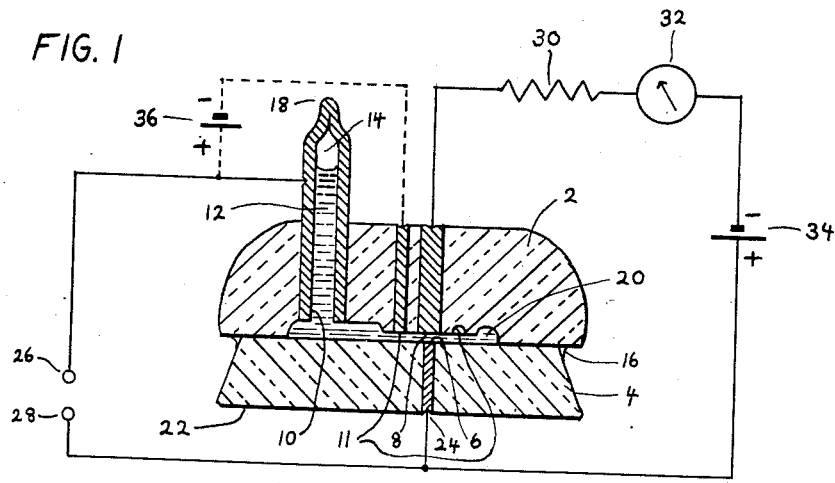
Figure 2:
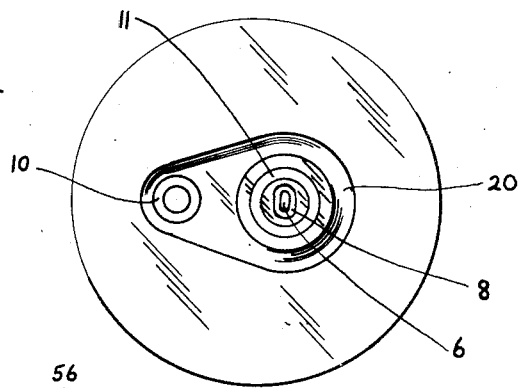
Figure 2 is a view of the tube in Figure 1 as seen from the bottom.

Referring now more particularly to Figures 1 and 2, an envelope, which may be constructed of vitreous material is shown comprising a body 2 covered by a cap 4. Four electrodes, 6, 8, 10, and 11 are sealed into the envelope. The electrodes are constructed of materials which will resist erosion by the electrolytic action of the tube. For example, platinum or platinum iridium alloy may be used. The surfaces of electrodes 6, 8 and 11 are flat and are flush with the inner surfaces of their respective portions of the envelope. Electrode 10 is of tubular form in order to facilitate filling and sealing the envelope.

An electrolyte 12 fills the envelope except for a small expansion space 14. The expansion space 14 is not essential if the exterior portion of tubular electrode 10 is made sufficiently flexible, by, for example, flattening the tube and keeping the walls thin. Body 2, and cap 4 may be sealed together at 16 in any suitable manner, and the completed tube may be sealed off at 18 by pinching and welding.

A groove 20 prevents contamination of the electrodes by material used in making the seal 16 which may be drawn into the tube by capillary action. The groove 20 also serves to lower the resistance in the electrolytic path between electrodes 6 and 10. For the electrolyte 12, I prefer to use a concentrated aqueous solution of potassium iodide, containing a small amount of excess iodine. A polished flat window in the cap 4 at 22 permits observation during assembly of the tube, if desired.

The tube shown in Figures 1 and 2 embodies certain general relations between its electrodes. (The term "electrode" is here taken to mean the surface actually in contact with the electrolyte.) These relations are as follows: (1) Every portion of electrode 6 is extremely close to some portion of electrode 8. For example, the spacing may be of the order of .00001". (2) A substantial portion of every electrolytic path between the electrodes 6 and 10 lies very close to electrode 8. (3) A substantial portion of every electrolytic path between electrodes 8 and 10 lies very close to electrode 11. (4) Consistent with the above relations, the electrolytic resistance between electrode 10 and any part of electrode 6 is small. The elongated form of electrode 6, as shown in Figure 2, is helpful in realizing this condition in tubes wherein the area of electrode 6 is relatively large. (5) Consistent with the above relations, the area of electrode 8 is kept small. (6) The area of electrode 10 is much greater than the area of electrode 6. The reasons for these relations will become apparent when the operation of the tube is hereinafter described.

A convenient method of connecting the tube into the external circuit is indicated at 24. The connecting wire is pointed and its end is held by spring pressure in a punch mark in the exterior end of electrode 6. This method of connection interferes neither with the making of window 22 nor with the visibility of the electrodes through the window. It also conserves platinum and makes possible a compact "socket" for very small tubes.

The operation of the tube will now be described. It will be helpful in considering the behaviour of the tube in its external circuit to draw the analogy with a vacuum tube circuit as the description proceeds. It will be remembered, however, that in its internal action my electrolytic tube is very different from that of the conventional vacuum tube.

The circuit shown in Figure 1 is similar to a circuit for a vacuum triode, except that the polarity is reversed. Electrode 6, the anode, is the electrode to which all potentials are referred, unless otherwise stated, and corresponds to a vacuum tube cathode. Electrode 8, the cathode, carries the load current and corresponds to a vacuum tube plate. Electrode 10 carries the control current and corresponds to a grid. Electrode 11 is required only in special circumstances. Accordingly it will be considered to have been disconnected for the moment. The input circuit comprises electrodes 6 and 10 and input terminals 26 and 28. The output circuit comprises electrodes 6 and 8 and either or both the load impedance 30 and the output current meter 32 together with a source of negative potential which is indicated by cell 34.

If the electrolyte is a solution containing potassium iodide with excess iodine as a depolarizer, the electrode reactions in the tube will be reduction of excess iodine to iodide ions at a cathodic electrode, and oxidation of iodide ions to excess iodine at an anodic electrode. It is assumed that all electrode potential differences will be kept sufficiently low to substantially prevent other electrode reactions such as, for example, the liberation of hydrogen. The excess iodine in the solution may be considered to associate itself with the simple iodide ions forming, for example, tri-iodide ions. However, for the sake of clearness in the following description, the excess iodine, as opposed to the simple iodide ions, will be spoken of as iodine, and the anodic and cathodic reactions will be termed respectively liberation and capture of iodine. Inasmuch as other chemicals may be used, a more general and descriptive terminology would refer to "generation" and "consumption" of a depolarizer. It will be seen in the explanation which follows that in general the tubes are operated in a condition where an electrode is wholly or partially starved for depolarizer, and that control of the output current is effected through the agency of controlling the supply of depolarizer.

In order to more clearly define the operation of the tubes herein described and to distinguish them from other devices operating by basically different mechanisms such as occlusion of electrodes by gas bubbles, formation of non-conducting films, or variations in ohmic resistance of an electrolyte, the term "depolarizer" or "depolarizing substance" as used in this specification and in the appended claims refers to a substance which, on being made available at an electrode surface already in contact with an electrolyte, may enter actively into an electrolytic reaction such that as current flows the potential across the electrode-electrolyte interface will be more favorable to the passage of current than would be the case if the current were to be sustained by a reaction not involving the depolarizer. It should be noted that the already mentioned procedure of keeping the potential applied to the tube low enough to prohibit alternative reactions makes the supply of depolarizer a primary current controlling factor and not a mere facilitating agent.

Upon connection of the tube into the circuit of Figure 1, the cell 34 causes a current to flow in the output circuit—namely between electrodes 6 and 8. This current is supported by capture of iodine at the cathode 8 and liberation of iodine at the anode 6. As a result, the concentration of iodine at the cathode 8 is quickly lowered. The cathode 8 becomes partly polarized and the current decreases. However, at the same time the iodine concentration at the anode is raised. There is thus set up an iodine concentration gradient which brings about a steady diffusion of iodine from the anode 6 to the cathode 8. The iodine, upon reaching the cathode 8 acts as a depolarizer and completes its circuit back to the anode 6 as iodide ions carrying the current. This current soon reaches and may continue at a relatively steady value somewhat below the initial value. It should be noted that in contrast with most electrolytic processes, there is in this case no substantial change either in the electrodes or in the quantity or net composition of the electrolyte. This may be termed a closed cycle process. Insofar as alternative reactions have been eliminated, Faraday's law of the proportionality of current to reacting substances insures that the current will be exactly proportional to the quantity of iodine reaching the cathode. Since the anode reaction is the inverse of the cathode reaction and the two electrodes are in series so that the same current flows through both, the same law insures that the quantity of iodine liberated at the anode will be exactly equal to the quantity captured at the cathode. Thus as long as no iodine escapes or is diverted from the active region, the total quantity in the region will remain constant. This accounts for the constancy of current.

As long as the cathode 8 is maintained at a potential sufficiently negative with respect to the anode 6, and the quantity of iodine in the cathode-anode space is kept moderate, the output current depends primarily on the rate of access of iodine to the cathode surface. This rate of access depends on the quantity of iodine in the cathode-anode space and on the closeness of spacing between the cathode and the anode. It is substantially independent of cathode potential over a certain range.

Suppose now that a source of variable potential is connected between input terminals 26 and 28 and that terminal 26 is made negative with respect to terminal 28 by some given amount, say 0.1 volt. A current will flow in the input circuit, namely between electrodes 6 and 10. As a result of this current there is a net liberation of iodine in the cathode-anode interelectrode space and a capture of iodine at the control electrode 10. The net increase of iodine in the cathode-anode space increases the accessibility of iodine to the cathode 8, and the output current begins to rise. As the control current continues to flow in the input circuit, a back potential develops between electrodes 6 and 10. For relatively low values of output current, the back potential may be accounted for principally by the change in potential between the anode 6 and the electrolyte, which occurs because of the change in iodine concentration at the anode 6. An additional potential change occurs between electrode 10 and the electrolyte. However, because of the relatively large area of electrode 10 as compared to electrode 6, the change in iodine concentration and the accompanying potential change at electrode 10 is negligible. The back potential between electrodes 6 and 10 increases, approaching the value of the control potential applied between terminals 26 and 28. This brings about a cessation of control current. Meanwhile the output current approaches a steady value which is a function of the control potential. If terminal 26 is now made somewhat less negative, there is a momentary control current flow in the reverse direction. Iodine is removed from the anode-cathode space and the output current drops.

If the terminal 26 is made somewhat positive, substantially all the neutral iodine will be removed from the cathode-anode space and the output current will be cut off. The effective cut off potential will depend on the concentration of iodine at electrode 10, and where this concentration is low, effective cut off will occur while terminal 26 is still negative.

One of the important advantages of this tube in comparison with a conventional vacuum tube is that it draws no power corresponding to heater or filament power, and thus requires no standby power while in a cut-off condition.

In order to maintain the tube in equilibrium with a constant output current, a very small steady control current in one direction or the other may be required. This may be considered as a leakage. It should be noted, however, that the change in output current is to be measured primarily in terms of total charge transfer in the input circuit rather than in terms of control current.

There are two oppositely acting mechanisms which tend to bring about control current leakage while the tube is operating at a constant control potential. One of these is the tendency for iodine to diffuse away from the anode-cathode space and thus to require replacement by the control current leakage. Factors which tend to promote this type of leakage are low cathode potential, high output current, and tube constructions which fail to insure that all diffusion paths away from the anode shall run for a substantial distance close to the cathode surface so that diffusing iodine will have a high probability of capture by the cathode and consequent return to the anode. Proper attention to these factors will result in very low leakage of this type.

The second type of leakage is due to diffusion of iodine from the region of electrode 10 to cathode 8. This iodine is captured upon reaching the edge of the cathode. The additional output current accompanying the capture serves to increase by an equivalent amount the iodine at the surface of the anode 6. The output current then tends to rise further exactly as if this same amount of iodine had been transferred to the anode by a flow of current in the control circuit. A reverse flow of control current is thus required in order to maintain equilibrium.

For most ordinary applications of the tube, control current leakage of the second type may be adequately limited simply by having a relatively low concentration of iodine in the electrolyte mixture used to fill the tube. For special applications such as use of the tube as an electrometer, it is desirable to have extremely low leakage. Electrode 11 has been included in the tube for the purpose of reducing leakage of the second type.

Suppose now that the electrode 11 is connected into the circuit as shown in Figure 1. A source of potential indicated by cell 36 makes electrode 11 negative with respect to electrode 10 by an amount which may be, for example, 0.5 volt. Under these conditions electrode 11 serves to capture iodine diffusing from the region of electrode 10 before it can reach electrode 8.

Another method of reducing the second type of control current leakage does not require the use of electrode 11. In this method the active surface of electrode 10 is formed of a metal, for example silver, which will on contact combine with iodine in the solution and which can also be reversibly deposited electrolytically from the solution. Some of the metal is also added to the solution as silver iodide. The flow of control current at electrode 10 is now supported by the deposition or removal of this metal. The reactions at electrodes 6 and 8 are unchanged. If iodine liberated in the cathode-anode space is allowed to escape into the rest of the tube it will eventually find its way to the surface of electrode 10 where it will react with the metal. The possibility of back diffusion is thus reduced. A disadvantage of this method in comparison with the use of the electrode 11 is that considerable care must be used in controlling the electrode potentials so as to prevent deposition of metal on electrode 8.

Some of the characteristics of the tube in Figure 1 as an integrator and also as an amplifier will now be considered. As has been shown, the output current is controlled by charge transfer in the input circuit. A convenient factor for expressing the effectiveness of a given tube in this respect may be called the charge sensitivity and may be measured in terms of microamperes of output current per microcoulomb of control charge. I have obtained values of charge sensitivity in excess of two thousand. The charge sensitivity is substantially constant over a considerable range of output current and thus forms the basis for the integrating action of the tube. Thus where the charge sensitivity is constant, change in output current is proportional to the time integral of control current. The charge sensitivity falls below its relatively high and substantially constant value at very low and also at very high values of output current. The range of substantially constant charge sensitivity tends to be increased at the high output current end by the use of a relatively high potential between the electrodes 6 and 8.

The factor in tube design which contributes to high charge sensitivity is the closeness of spacing between anode and cathode, together with the avoidance of any portions of the anode area not so closely spaced. The charge sensitivity gives an indication of the speed of response of the tube. For example, if a tube has a charge sensitivity of 1000, then for every atom of iodine liberated in the cathode-anode space as a result of control charge transfer, 1000 atoms of iodine per second must reach the cathode in order to support the corresponding output current. Consequently the average transit time for an iodine atom diffusing from anode to cathode will be .001 second and the speed of response of the tube to a control charge transfer will be of the same order of magnitude.

The voltage sensitivity or transconductance of the tube is obtained from the output current as a function of control potential. It depends on the building up of back potential between electrodes 6 and 10 which takes place during charge transfer in the control circuit and has already been described. For low currents, the output current is substantially an exponential function of control potential. In this range a signal of approximately 20 millivolts serves to double the output current. At higher currents the function tends to become linear with the transconductance reaching a maximum and remaining substantially constant for a certain range. At still higher currents, the transconductance falls. With this tube it is possible to obtain very much higher values of transconductance than are obtainable with a conventional vacuum tube of equivalent size. For a tube with a given anode-cathode spacing, the transconductance increases with increasing anode area. At the same time the effective control circuit capacitance (corresponds to grid-cathode capacitance in a vacuum tube) also increases, and may easily exceed a thousand microfarads. A high value of input capacitance is advantageous in many integrator applications since it reduces the amount of back potential reacting on the circuit which supplies the current to be integrated. An example of such an application is the use of the circuit in Figure 1 as a fluxmeter by connecting a relatively high resistance search coil between terminals 26 and 28. When used as an amplifier, where the tube is required to come quickly into equilibrium following a potential change in the input circuit, the effective input capacitance may be reduced by the use of an anode of small area and also be placing a resistance in series with the anode 6. This latter procedure corresponds to use of the well known cathode follower circuit with vacuum tubes.

In addition to having a very high value of transconductance, the tube in Figure 1 also has a very high amplification factor. This results from the fact that the cathode polarization is of such a nature that with constant control potential the output current remains substantially constant over a certain range of cathode potential. The tube may therefore be effectively coupled to a high impedance load. In this respect it resembles a pentode rather than a triode. In using the tube with a high impedance load, there is an effect corresponding to grid-plate capacitance in a vacuum tube, which should be considered. The effect is evidenced by an increase in apparent input capacitance. Two contributing factors are a decrease in charge sensitivity with cathode potential, which occurs primarily where high output current exists in combination with low cathode potential, and an effective capacity between the cathode and the electrolyte. The effect is minimized by the use of high cathode potential, and moderate output current, and by the avoidance of excessive cathode area.

In operation of the tube at relatively high frequencies, the internal series resistance in the input circuit may become an important factor. In general the measures taken to reduce control current leakage also increases this resistance. For this reason when high frequency response is required at the expense of increased control current leakage, electrode 11 should be omitted and cathode 8 made relatively small. This allows groove 20 to be brought in very close to anode 6.

The proportions of the tube shown in Fig. 1 may be so chosen that cap 4 is very thin and groove 20 is very wide. Under these circumstances cap 4 becomes a flexible diaphragm whose center may easily be deflected for the purpose of changing the anode-cathode spacing. Such deflection changes the characteristics of the tube, the charge sensitivity in particular. For example, suppose that a given quantity of iodine has been set free in the anode-cathode space and that the anode is now deflected toward the cathode at a moderate rate of speed. There will be a tendency for the iodine to be pushed out toward the edge of the cathode, but this is counteracted by the effect of the output current, which electrolytically reconcentrates the iodine at the anode. As the iodine remains in the diminishing cathode anode space, its concentration increases. This in turn increases its access to the cathode and the output current rises. The change in output current thus becomes a measure of the anode deflection. This deflection may be produced by the mechanical displacement of a member under stress, or the like, where it is desirable to obtain highly sensitive indications of motion.

From the foregoing description it will be apparent to those skilled in the art that other electrolytic solutions may be used in the tube. In particular an alcoholic solution may be used for operation at very low temperatures. Among other alternatives is the use of bromine and bromide as the active components. This gives lower values of transconductance, but the high rate of diffusion of bromine may be advantageous in tubes which are required to operate at relatively high frequencies.

Figure 3:
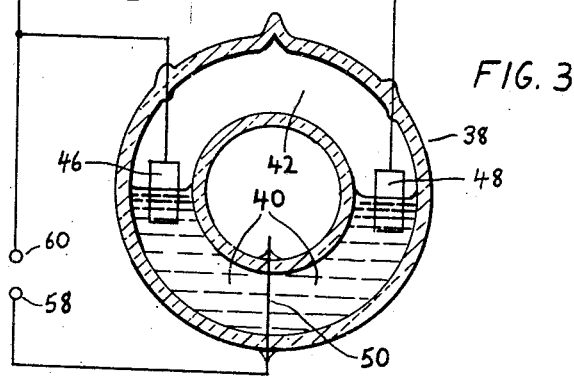
Figure 3 is a view of a modified form of electrolytic amplifier tube.

In Fig. 3 is shown an electrolytic amplifier tube which, like the tube in Fig. 1, controls an output current by access of a depolarizer to an electrode surface. However in the tube of Fig. 3 the depolarizer reaches the electrode surface through the electrode material rather than through the electrolytic solution. An envelope 38 which may be of toroidal form, is partly filled with an electrolyte 40 which may be a dilute solution of sulfuric acid. The remainder of the tube is filled with hydrogen gas 42. Three electrodes, anode 46, cathode 48 and control 50 correspond respectively to electrodes 6, 8 and 10 in Fig. 1 insofar as the operation of the tube in the external circuit is concerned. A source of potential, indicated by cell 52, serves to make electrode 48 negative with respect to electrode 46. An output meter 54, a load resistance 56, and input terminals 58 and 60 are also shown in the external circuit. Electrodes 46 and 48 may be of platinum or platinum black and operate as hydrogen electrodes. Their exact form is not critical. Electrode 50 may be a very thin palladium foil which crosses the tube and divides the electrolyte into two non-communicating portions. Flow of output current takes place between electrodes 46 and 48 and must thus be accompanied by separate electrode reactions at the opposite faces of electrode 50 and by metallic conduction of electrons through the palladium foil.

When the tube is first connected into the circuit of Fig. 3, the steady output current will be negligible owing to polarization of the right hand face of electrode 50. It is assumed that the potential of cell 52 will be kept low enough to prevent any substantial liberation of oxygen or oxidation of palladium at the right hand face of electrode 50. Now suppose that a source of potential is connected between terminals 58 and 60, terminal 58 being made sufficiently negative to cause an input current to flow in the left hand portion of the tube between electrodes 46 and 50. This current is accompanied by the production of hydrogen at the left hand face of electrode 50. The hydrogen so produced does not appear in the form of bubbles but is absorbed by the palladium. The absorbed hydrogen quickly diffuses to the right hand face of electrode 50 where it is reconverted to hydrogen ions, thus acting as a depolarizer and allowing output current to flow. The output current, flowing in series through the two portions of the tube, replenishes the supply of hydrogen at the left hand face of electrode 50. Therefore the output current will continue to flow steadily after the input current between terminals 58 and 60 ceases. Also the hydrogen liberated at electrode 48 travels around the top of the tube and replenishes the hydrogen used up by electrode 46. Thus, as in the case of the tube in Fig. 1, there is no substantial change in the net contents of the tube. A transfer of control charge between terminals 58 and 60 increases or decreases (depending on direction of transfer) the net content of hydrogen in electrode 50. This in turn changes the available hydrogen concentration gradient at the right hand surface of electrode 50, which in turn determines the rate of depolarization and thus controls the output current. With increasing hydrogen content, the left hand face of electrode 50 develops an increasing back potential with respect to the electrolyte. This back potential controls the transconductance in much the same way that transconductance of the tube in Fig. 1 is controlled by back potential due to iodine concentration at electrode 6.

Figure 4:
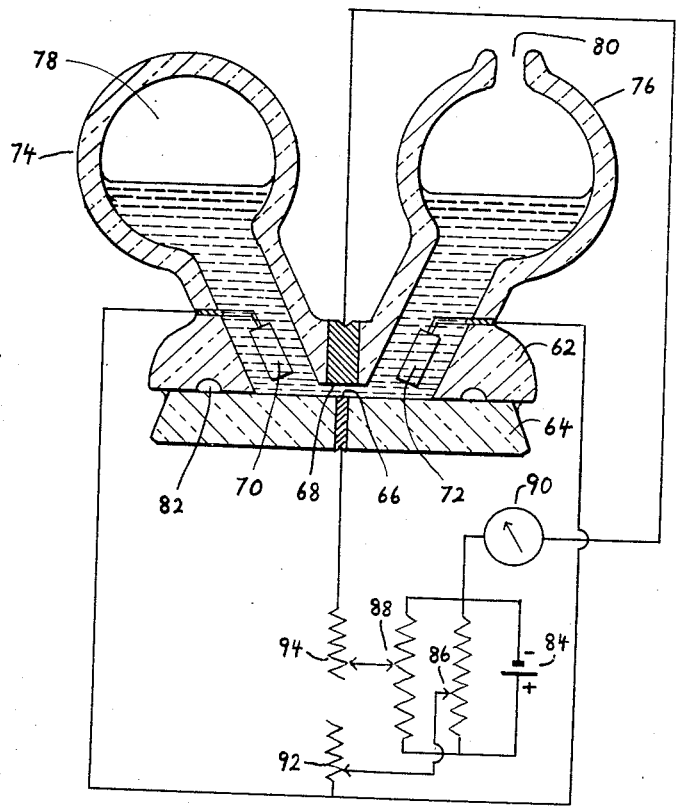
Figure 4 shows a modification of the electrolytic amplifier tube of Figure 1 together with provision for detection of fluid flow and an application thereof.
Figure 5:
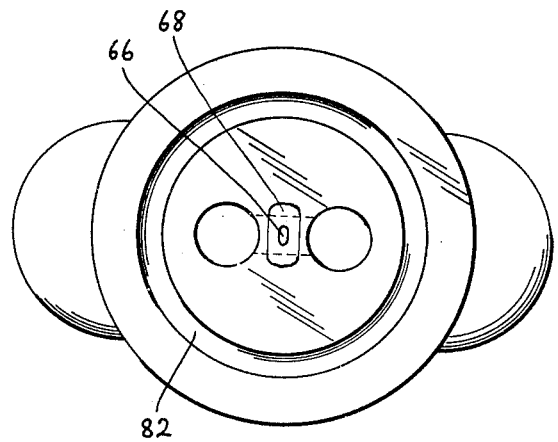
Figure 5 is a partial view of the tube in Figure 4, as seen from the bottom.

In Fig. 4 is shown a modification of the electrolytic amplifier tube in Fig. 1. In addition to sensitivity to electrical signals as described in connection with the tube of Fig. 1, this tube is also sensitive to hydraulic signals involving the motions of the electrolyte with respect to the electrodes. The tube is provided with means for the efficient introduction of such signals and is shown in one of many possible applications, namely detection of very small changes in a gas volume due to variations in barometric pressure or temperature. The general method of construction and the electrolyte may be the same as for the tube in Fig. 1, and have already been described. The tube comprises a body 62 and a cap 64. An anode 66, and a cathode 68 correspond respectively to electrodes 6 and 8 in Fig. 1. The control electrodes 70 and 72 are provided. For some applications these will be connected in parallel as shown and together correspond to electrode 10 in Fig. 1. I provide two reservoirs, 74 and 76, which are each partly filled with electrolyte. Reservoir 74 is closed at the top and contains the gas 78 whose expansion or contraction is to be detected. Reservoir 76 has an opening 80 connecting it with atmospheric pressure. The cathode-anode space between electrodes 66 and 68 serves as a channel connecting the two reservoirs. A preferred arrangement for this channel is shown by the view in Fig. 5. In this view, the effective lateral boundaries of the channel are indicated by the dotted lines. The arrangement is such that substantially all the flow of electrolyte from one reservoir to the other must pass close to the surface of cathode 68. At the same time the entire area of anode 66 is exposed to this flow. A groove 82 may be located in body 62, surrounding but not connecting with the electrodes and the entrances to the reservoirs, to protect the electrodes from material used to seal cap 64 in place.

The external operating circuit of Fig. 4 comprises a source of potential indicated by cell 84, two potentiometers 86 and 88, an output current meter 90, and variable resistances 92 and 94. Cell 84 in conjunction with potentiometers 86 and 88 serves to apply a variable negative potential to electrode 68 with respect to electrode 66, and a variable positive or negative potential to electrodes 70 and 72 with respect to electrode 66.

In following the operation of the tube it should be remembered that its response to electrical signals is the same as that of the tube in Fig. 1. For the moment suppose that there is no flow of electrolyte, and that the potentiometers are adjusted so that electrode 68 is 0.5 volt negative with respect to electrode 66, and electrodes 70 and 72 are 0.1 volt positive with respect to electrode 66. If the concentration of excess iodine in the tube as a whole is moderate, these conditions will suffice to substantially cut off the output current through meter 90. Now suppose that there is a drop in barometric pressure. Gas 78 will tend to expand, forcing electrolyte to flow from reservoir 74 to reservoir 76. This hydraulic flow carries iodine into contact with cathode 68, depolarizing it and allowing output current to flow between electrodes 66 and 68. At the same time current flows between electrode 68 and electrodes 70 and 72. When the hydraulic signal is removed, this current removes the iodine from the cathode anode space, and the tube returns to its original cut-off condition. Resistor 92 impedes the flow of control current to electrodes 70 and 72 and thus influences the time of decay of the output current after the hydraulic signal ceases. The decay time may be made quite long and is useful in cases where a relatively steady output current is required in response to an oscillatory hydraulic signal. On the other hand if the output current is required to follow rapidly in response to both increases and decreases in hydraulic flow, the rate of electrical removal of iodine brought hydraulically into the cathode anode space can be increased by several means. These include decreasing the value of resistor 92, and increasing the positive bias of electrodes 70 and 72 with respect to electrode 66; also reducing the potential between electrodes 66 and 68, and increasing the value of resistor 94 in order to decrease the proportion of iodine circulated locally between electrodes 66 and 68. In connection with the two latter procedures, it should be noted that, in general, current removing iodine from the cathode anode space takes place between electrode 68 and the control electrodes 70 and 72, and is thus registered on meter 90. Accordingly at the expense of loss in sensitivity, electrode 66 may be eliminated entirely or may be connected in parallel with electrode 68.

The tube as shown in the circuit of Fig. 4 is symmetrical, responding equally to a hydraulic signal in either direction. The response may be made asymmetric simply by disconnecting one of the control electrodes, for example, electrode 72, from the circuit as shown and connecting it in parallel with cathode 68. This will cause a current to flow between electrodes 70 and 72 which will not cease until substantially all the iodine has been transferred from reservoir 76 to reservoir 74. In this condition the tube, adjusted to operate in cut-off condition with no hydraulic signal, will respond to a hydraulic flow from reservoir 74 to reservoir 76 but will not respond to a hydraulic flow from reservoir 76 to reservoir 74. Alternatively the bias potential between electrodes 66 and 70 may be adjusted to give in the absence of a hydraulic signal an output current which, on the application of the hydraulic signal, will be either increased or decreased according to the direction of hydraulic flow. In this case decrease of the zero signal output current is accomplished through sweeping out of the iodine from the cathode anode space by the iodine free solution from reservoir 76, and aided by exposing the entire area of anode 66 to the hydraulic flow. In operating the tube asymmetrically as described, care should be taken to limit the rate or quantity of flow so as to avoid any substantial hydraulic transfer of iodine into reservoir 76. At low rates of flow, such transfer is avoided by electrical removal of iodine from the cathode region before it can pass through into reservoir 76. The efficiency of electrical removal is kept high by the already mentioned feature of tube design whereby all flow between the reservoirs must pass close to cathode 68. The efficiency is further aided by the use of a relatively large area for electrode 68.

The tube in Fig. 4 is sensitive to very small rates of hydraulic flow, which may be produced by very low pressure differences between the two reservoirs. For this reason the tube may be effectively used with a very long hydraulic time constant to measure steady pressures over moderate periods of time. For many applications it will be desirable to seal the electrolyte off completely from the signal source. For this purpose reservoirs 74 and 76 may each be made in the form of a flexible bellows. The tube is then completely filled with electrolyte and closed. The high volume sensitivity of the tube helps to minimize the effect of added stiffness introduced into the hydraulic circuit by the bellows.

An example of the use of such a tube is as an accelerometer in which a difference in pressure between the two sides of the tube is obtained through the inertial effect of the electrolyte, the flexible portions of the bellows, and any additional mass which may be attached thereto.

Having described my invention and various embodiments thereof by way of illustration, I claim:

1. An electric tube comprising an envelope containing an electrolyte and a depolarizing substance, two electrodes in spaced relation within said envelope to define an electrolytic path for an output circuit through said tube to an external circuit, and a control electrode in contact with said electrolyte to which an electrical signal may be applied for controlling the rate of access of said depolarizing substance to the surface of one of the electrodes in said output circuit.

2. An electric tube comprising an envelope containing an electrolyte and a depolarizing agent, two electrodes in spaced relation within said envelope to define an electrolytic path for an output circuit through said tube to an external circuit, a control electrode in contact with said electrolyte to which an electrical signal may be applied for controlling the rate of access of said depolarizing agent to the surface of one of said electrodes, and a guard electrode to which an electrical potential may be applied to prevent spurious access of said depolarizing agent to said surface.

References Cited in the file of this patent

UNITED STATES PATENTS

| Number | Name | Date |
| --- | --- | --- |
| 929,371 | Arsem | July 27, 1909 |
| 962,014 | Fessenden | June 21, 1910 |
| 962,015 | Fessenden | June 21, 1910 |
| 974,838 | Smythe | Nov. 8, 1910 |
| 1,329,761 | Gage | Feb. 3, 1920 |
| 1,808,709 | Blake | June 2, 1931 |
| 2,350,378 | Wallace | June 6, 1944 |
| 2,384,463 | Gunn | Sept. 27, 1944 |

FOREIGN PATENTS

| Number | Country | Date |
| --- | --- | --- |
| 337,983 | France | July 29, 1908 |
| 483,166 | Germany | Sept. 27, 1929 |

OTHER REFERENCES

"The Electrical Experiments," April 1916, page 703.